United States Patent [19]

Crooks

[11] 3,788,607

[45] Jan. 29, 1974

[54] WINCH MECHANISM

[75] Inventor: James W. Crooks, Milwaukee, Wis.

[73] Assignee: R. L. Smith Gear Company, Milwaukee, Wis.

[22] Filed: Jan. 7, 1972

[21] Appl. No.: 216,146

[52] U.S. Cl............................................. 254/186 R
[51] Int. Cl.............................................. B66d 1/28
[58] Field of Search..................... 254/150 R, 186 R

[56] References Cited
UNITED STATES PATENTS

| | | | |
|---|---|---|---|
| 2,959,371 | 11/1960 | Melton | 254/150 R |
| 1,424,990 | 8/1922 | Mitchell | 254/150 R |
| 1,763,023 | 6/1930 | Tyler | 254/186 |
| 2,351,060 | 6/1944 | McLauthlin | 254/186 |
| 3,589,526 | 6/1971 | Woodside | 212/66 |
| 3,101,138 | 8/1963 | Wochner | 254/186 |
| 1,486,845 | 3/1924 | Stanley | 254/150 |

FOREIGN PATENTS OR APPLICATIONS

| | | | |
|---|---|---|---|
| 638,068 | 4/1962 | Italy | 254/150 |

Primary Examiner—Evon C. Blunk
Assistant Examiner—James L. Rowland

[57] ABSTRACT

This invention relates to a winch mechanism comprising a closed gear housing which contains a worm and wheel assembly having an output shaft journaled in spaced bearings supported in the housing. One portion of the housing is formed as an elongated hollow support having a distal end in which one of the bearings is mounted. The shaft projects beyond the distal end. A cylindrical pulley of cup-shaped configuration is secured to the distal end of the shaft in such manner as to encircle the elongated portion of the housing, the bearing in the distal end of the housing being situated substantially midway between the ends of the pulley. Radial loads on the pulley are, therefore, substantially radially imposed on the bearing such that little or no bending movement is applied to the shaft.

3 Claims, 5 Drawing Figures

3,788,607

3,788,607

WINCH MECHANISM

FIELD OF THE INVENTION

The invention relates to a winch mechanism and more particularly to the configuration of a pulley and support bearing which minimizes bending moments on the pulley-supporting shaft.

BACKGROUND OF THE INVENTION

It is conventional in the prior art to mount a pulley on one end of a rotatable shaft which is journaled outward of a housing on spaced-apart bearings. With a radial load applied to the pulley, the shaft resembles a cantilever which results in the imposition of non-radial loads on the shaft bearings. It further imparts a bending moment to the shaft.

SUMMARY OF THE INVENTION

The present invention overcomes the problem of applying non-radial loads to both bearings as well as the bending moment on the shaft. This is accomplished in a winch mechanism comprising a supporting frame and a shaft journaled on the frame by means of first and second spaced-apart bearings. A pulley carried on the shaft for rotation therewith is provided with a strand-receiving rim coaxial with respect to the shaft. The rim is positioned with its axial mid-portion radially coincident with one of said bearings. Gear means mounted on the frame is connected to the shaft for imparting rotation thereto. By reason of the mid-portion of the pulleys radially coinciding with said one bearing, radial loads on the pulley will be imparted radially normally to the bearing in a planar relationship thereby in turn imparting a load to the shaft to which the pulley is connected in the same plane. This relieves the shaft of bending moments.

It is an object of this invention to provide a shaft and pulley assembly wherein the bearing is located internally of the pulley substantially midway between the ends thereof whereby radial loads applied to the pulley will generally be in radial coincidence with the bearing.

It is another object of this invention to provide an improved winch mechanism which is simple, economical and reliable.

The above-memtioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
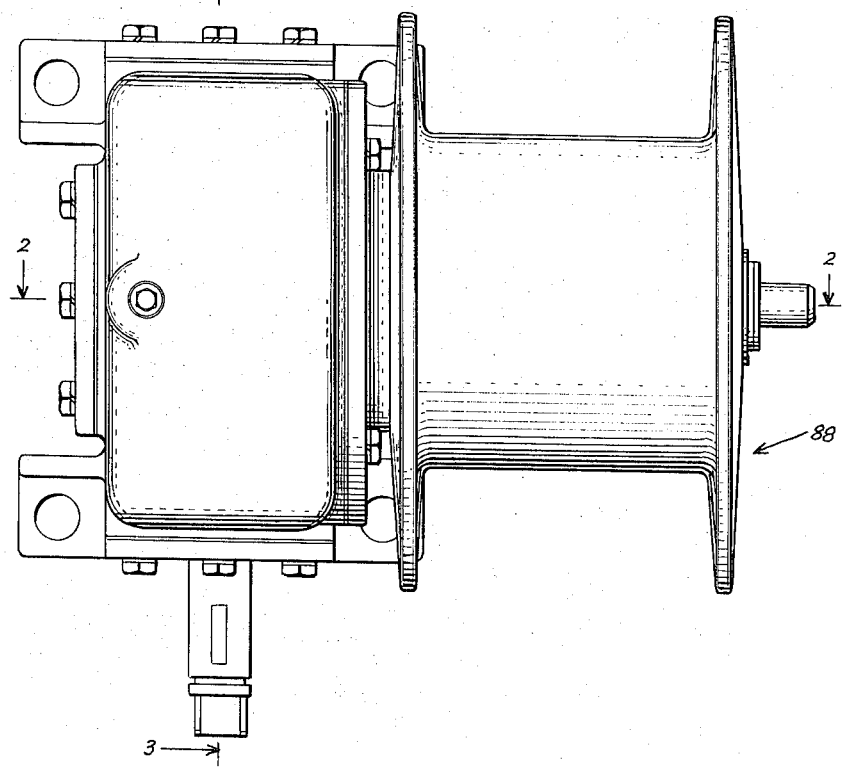
FIG. 1 is a top plan view of one embodiment of this invention.

Referring to the drawings, a closed housing 10 has a primarily rectangular portion 12 and an elongated frusto-conically shaped portion 14 projecting laterally from one side of the portion 12. A shaft 16 is journaled in the housing 10 by means of spaced roller bearing assemblies 18 and 20, bearing assembly 18 being mounted in the end wall 22 of the housing portion 12 and the bearing assembly 20 distally in the portion 14 as shown. The distal end 24 of the shaft 16 is of reduced diameter to provide an annular shoulder 26 against which is positioned an annular spacer 28, annular shims 30 being disposed between the spacer 28 and the inner race 32 of the bearing assembly 20. The outer race 34 of bearing assembly 20 is positioned in a complementarily-shaped recess 36 in the housing portion 14 thereby to restrain the bearing assembly 20 from rightward movement with respect thereto. The spacer 28, shims 30 and the annular retaining seat 36 serve in securing the shaft 16 against rightward movement.

A rubber O-ring seal 38 is fitted into a companion groove in the shaft end 24 and is engaged by a sleeve-type spacer 40 fitted to the shaft end 24 and in engagement with the inner race 32. An annular oil seal 42 is interposed between the inner periphery of the frame portion 14 and the spacer 40 as shown thereby to prevent the leakage of oil from the portion 14.

Figure 2:
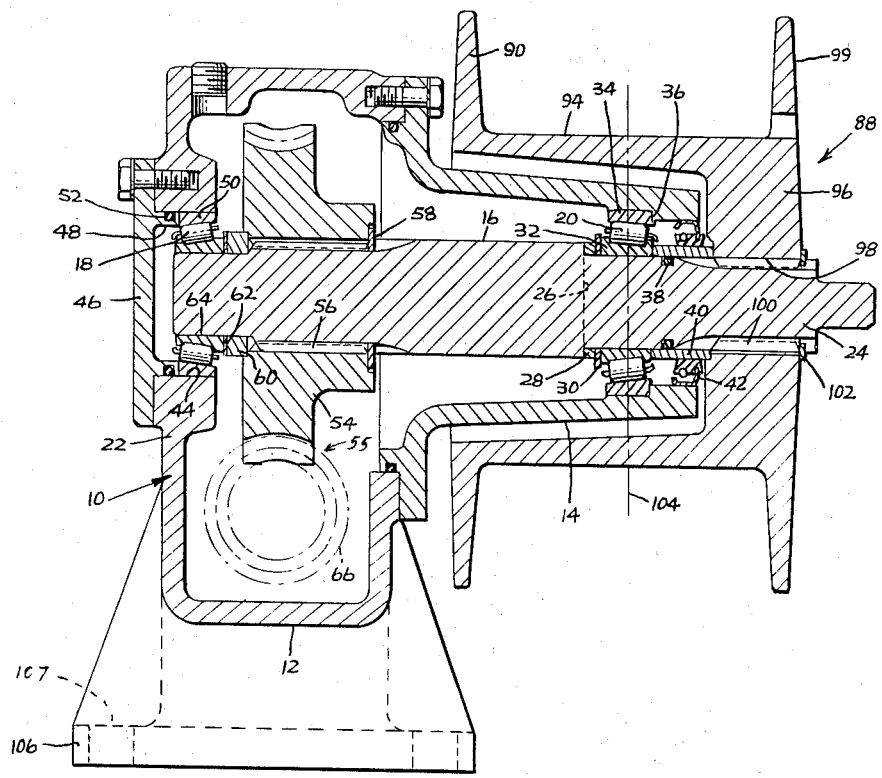
FIG. 2 is a cross-section taken substantially along section line 2—2 of FIG. 1.
Figure 3:
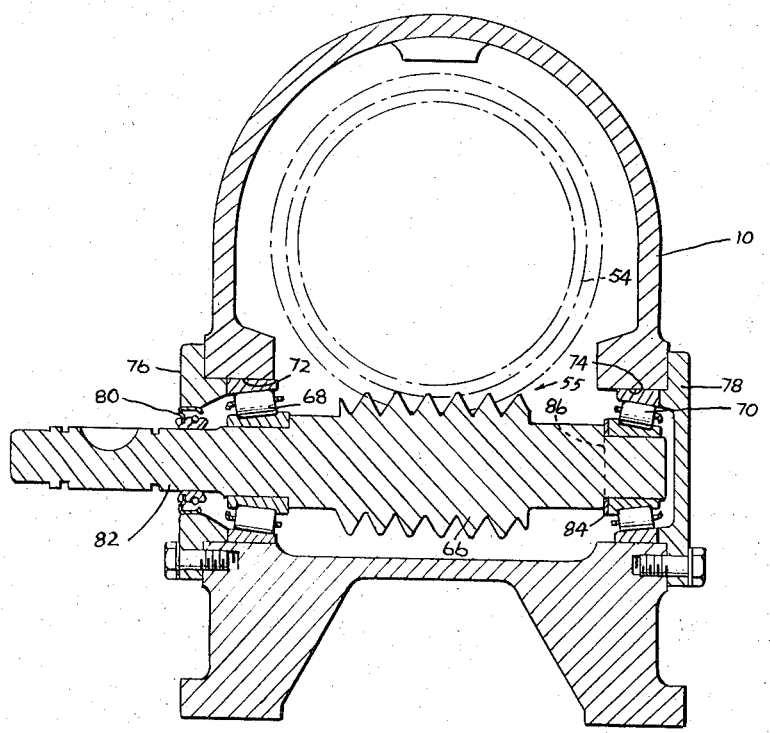
FIG. 3 is another cross-section taken substantially along section line 3—3 of FIG. 1.

The bearing 18 is mounted in an opening 44 in the housing wall 22 with a sliding fit. A closure plate or cap 46 is bolted to the wall 22 and is provided with an annular, inwardly projecting abutment 48 which engages the outer race 50 of the bearing 18 securing same against leftward movement. A rubber O-ring seal 52 is fitted in an annular groove 53 in the outer periphery of the abutment 48 and engages the wall of the opening 44 to provide a seal against the leakage of oil from the housing 10. A conventional gear wheel 54 of a worm and wheel assembly 55 is secured to the shaft 16 by means of a splined connection 56 and is held against rightward movement on the shaft 16 by means of a snap ring 58. An annular spacer 60 and annular shims 62 are fitted between the inner race 64 of the bearing 18 and the gear wheel 54 thereby locating the shaft 16 against leftward movment. A conventional worm gear 66 meshed with the gear wheel 54 is journaled in spaced bearings 68 and 70 mounted in housing 10, each of the bearings 68, 70 being fitted into companion openings 72 and 74, respectively, bearings 68, 70 being held against outward movement by respective closure plates 76 and 78 in engagement therewith. An annular seal 80 between the closure 76 and the worm shaft 82 prevents the leakage of fluid from the housing 10. The outer closure 78 is sealed to the housing 10 with an O-ring the same as that disclosed in connection with the closure plate 46 of FIG. 2. Annular shims 84 on the worm shaft 82 are disposed between the inner race of the bearing 70 and shoulder 86 on shaft 82 to position the worm 66 axially for proper engagement with the gear wheel 54.

The shims 30 and 62 are selected to have thicknesses which exactly position the gear wheel 54 radial center line with respect to the worm 66 axial center line for the purpose of achieving maximum gear mesh alignment and proper bearing end play. One set of shims 84 on the worm shaft 82 enables proper adjustment for end play for the bearings 68 and 70.

A cylindrically-shaped pulley generally indicated by the numeral 88 is cup-shaped with annular end flanges 90 and 92 on the cylindrical rim 94. The bottom or end 96 has an opening 98 which receives the distal end 24 of the shaft 16. This end 96 is secured for rotation to the end 24 by means of a splined connection 100. A snap ring 102 on the shaft end 24 secures the pulley against rigtward movement while abutting engagement thereof with the spacer 40 prevents leftward movement.

The hollow portion of the pulley 88 encircles with clearance the frame portion 14 as shown. The pulley 88 itself, as well as the other parts of the assemblage, are so proportioned and positioned such that pulley 88 and bearing 20 are substantially axially symetrically disposed with respect to a radial plane 104 which extends normally to and through the center of axis 105 of bearing 20. The reason for this will be explained further below.

A mounting base 106 integral with the housing 10 is provided with suitable mounting holes as at 107 for securing the winch to a support (not shown).

In operation, rotation of the worm shaft 82 will result in corresponding rotation of shaft 16 and pulley 88. Lubricating oil contained in the housing will be prevented from leaking therefrom by reason of the various O-ring seals illustrated and described. If it is assumed that a strand or cable is wound around the drum 88 in radial plane 104, it will be noted that radial tension or load on the strand outwardly from the drum 88 will be in the plane 104. Thus, this load is applied radially normally to the bearing 20 and in turn to the shaft 16. This imparts neither a bending moment to the shaft 16 nor any of the pulley load to the other bearing 18.

Figure 4A:
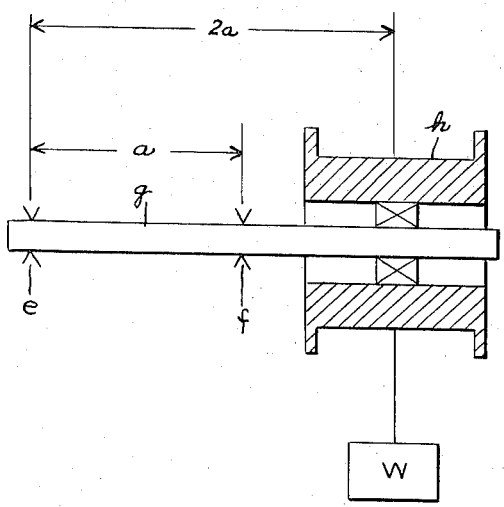
FIGS. 4a and 4b are diagrammatic illustrations used in explaining the principles of this invention.
Figure 4B:
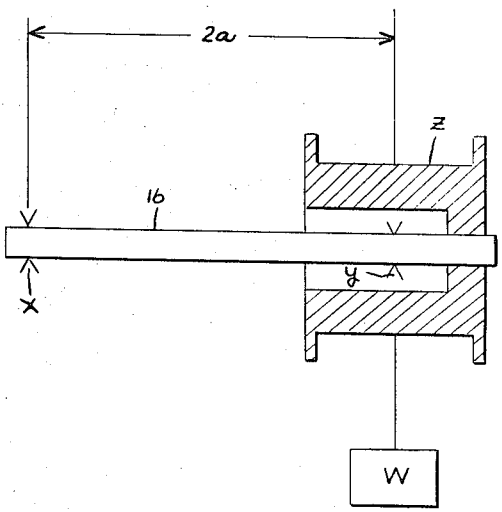

This load distribution is better understood by reference to FIGS. 4a and 4b. In FIG. 4a is illustrated diagrammatically a conventional, cantilevered type shaft and pulley mounting, and in FIG. 4b the mounting of this invention. Spaced bearings in FIG. 4a, indicated by the letters $e$ and $f$, are spaced apart to provide fixed rotational support for the shaft $g$. A load $W$ on the pulley $h$ will impose on the bearing $e$ a load equal to W, while on the bearing $f$ will be imposed double this load, or in other words 2W. In this invention, as diagrammed in FIG. 4b, there will be no load imposed on the bearing $x$ and only a load equal to $W$ on bearing $Y$. Thus, it is apparent that no bending moments will be applied to the pulley-supporting shaft 16 of this invention and only one of the supporting bearings will have a load imparted thereto, this being limited to the actual load on the pulley. The remaining bearing will have no load applied. Overall bearing loading as well as shaft deflection are thereby kept to a minimum.

While there have been described above the principles of this invention in connection with specific apparatus, it is to be clearly understood that this description is made only by way of example and not as a limitation to the scope of the invention.

What is claimed is:

1. A winch mechanism comprising a supporting frame in the form of a housing, said housing including an elongated tubular portion and a larger portion on one end thereof, a shaft in said housing disposed coaxially with respect to said tubular portion, bearing means mounting said shaft for rotation inside said housing, said bearing means including a first roller bearing assembly mounted inside said tubular portion adjacent to the distal end thereof and a second roller bearing assembly mounted on the larger portion of said housing, said bearing assemblies mounting the opposite end portions of said shaft with said shaft extending beyond the distal end of said tubular portion, a worm and gear assembly operatively mounted within the larger portion of said housing, said gear being coaxially affixed to said shaft for imparting rotation thereto, a cup-shaped pulley having a cylindrical rim and a disc-like hub coaxially affixed to the aforesaid shaft extension, the inner periphery of said pulley coaxially surrounding said tubular portion and being adjacent thereto for the full length of said inner periphery, the distal end of said tubular portion being adjacent to said hub, said pulley being positioned relative to said first bearing assembly with its mid-portion radially coincident therewith, and a mounting base integral with the larger portion of said housing disposed laterally of the side of said pulley whereby a belt passed about said pulley will have no interference with said mounting base.

2. The mechanism of claim 1 in which said larger portion of said housing is box-shaped with said worm being journalled therein, said mounting base being disposed on one side of said housing, sealing means outboard of said first bearing assembly between an inner peripheral portion said tubular portion and said shaft for preventing leakage of liquid lubricant from said housing.

3. The mechanism of claim 2 in which said tubular portion is frusto-conically shaped and the inner periphery of said pulley is similarly shaped.

* * * * *